(12) United States Patent
Ida (10) Patent No.: US 7,202,584 B2
(45) Date of Patent: Apr. 10, 2007

(54) POSITION-CONTROL STAGE SYSTEM (75) Inventor: Eiji Ida, Kamakura (JP)

(73) Assignee: Nippon Thompson Co. Ltd., Tokyo (JP)

( * ) Notice: Subject to any disclaimer, the term of this patent is extended or adjusted under 35 U.S.C. 154(b) by 0 days.

(21) Appl. No.: 11/113,085

(22) Filed: Apr. 25, 2005

(65) Prior Publication Data

US 2005/0258696 A1    Nov. 24, 2005

(30) Foreign Application Priority Data

May 21, 2004   (JP)   ............................. 2004-151305

(51) Int. Cl.
*H02K 21/24*   (2006.01)

(52) U.S. Cl. .................... 310/156; 310/12; 310/13; 310/268; 310/90

(58) Field of Classification Search ................. 310/90, 310/268, 156.32–156.37, 67 R
See application file for complete search history.

(56) References Cited

U.S. PATENT DOCUMENTS

| | | | |
|---|---|---|---|
| 4,757,222 A * | 7/1988 | Shiraki et al. ............ | 310/68 B |
| 5,684,344 A * | 11/1997 | Takei ......................... | 310/12 |
| 6,170,350 B1 * | 1/2001 | Behm ......................... | 74/425 |
| 6,208,050 B1 * | 3/2001 | Fujii et al. .................... | 310/90 |
| 6,552,449 B2 | 4/2003 | Tsuboi et al. | |
| 6,732,435 B2 * | 5/2004 | Kiyosawa .............. | 29/898.066 |
| 2004/0061383 A1 * | 4/2004 | Tsuboi et al. ................. | 310/13 |

FOREIGN PATENT DOCUMENTS

| | | |
|---|---|---|
| JP | 05-091710 | 9/1993 |
| JP | 2002328191 | 11/2002 |
| JP | 2004072960 | 4/2004 |

* cited by examiner

*Primary Examiner*—Darren Schuberg
*Assistant Examiner*—Ondria Garner
(74) *Attorney, Agent, or Firm*—Browdy and Neimark, PLLC (57) ABSTRACT

A position-control stage system is disclosed, which may ensure much space to install the armature assembly on the bed, even with small in dimension. Correspondingly, the position-control stage system itself is made high in propulsion and efficient in operating performances including high-speed traveling, high response, high-precision position-control, and so on, even with compact or slim in construction. Armature windings to provide an armature assembly are made of three-phase coreless windings wound in annular flat configuration, and disposed on the bed radially outside of a rolling-contact bearing in a way closely adjacent to the bearing. Magnets to provide a field magnet array are each made in a segment, and disposed on the turntable in opposition to the armature windings in a way alternating in polarity circularly on a desired circular surface.

1 Claim, 6 Drawing Sheets

POSITION-CONTROL STAGE SYSTEM

FIELD OF THE INVENTION

The present invention relates to a position-control stage system with onboard a motor comprising armature windings and field magnets, which has been extensively used in fields as diverse as semiconductor manufacturing equipments, assembling machines, precise testing machines, measuring/inspection equipments, and so on.

BACKGROUND OF THE INVENTION

In recent years, position-control stage systems have been needed to be compact or slim in construction and able to operate with high speed and high response to make sure of high speed movement and accurate position control so as to meet anticipated design specifications in extensively increased fields including semiconductor industries, and the like. A typical version of the prior position-control stage systems has an onboard permanent-magnet motor comprised of a primary side of armature windings and a secondary side of field magnets.

An example of the prior position-control stage systems as stated earlier is disclosed in, for example Japanese Patent Laid-Open No. 2004-72960 in which there is installed an onboard permanent-magnet motor made up of the primary side of armature windings and the secondary side of field magnets. The armature windings are made of three-phase coreless windings wound in annular flat configuration. The armature windings are arranged on a stationary bed in juxtaposition with one another along a circular pattern of a preselected radius of curvature in a way each of which is oriented in a radial direction of the circular pattern. Magnet segments to provide a field magnet are each made in a rectangular shape. The magnet segments are oriented in radial direction respectively and disposed on a turntable in opposition to the armature windings in a way alternating in polarity circularly. The prior position-control stage system constructed as stated earlier is envisaged making it easier to extend largely an angular movement in circular direction for position control, rendering the position-control stage system itself compact or slim in construction, allowing the position-control stage system to work with high precision in clean environment and further produce the stage system with inexpensive cost.

In for example Japanese Patent Laid-Open No. 2002-328191, there is disclosed a stage system with an onboard linear motor, in which just tiny angular position-control may be realized by virtue of the linear motor. The prior stage system is made smaller in construction as well as reduced in the overall height and also improved in response to high-speed operation. The prior stage system is comprised of a first stage lying on a base stage for linear movement in an X-direction relatively to the base stage, a second stage lying on the first stage for linear movement relatively to the first stage in a Y-direction, a turning stage supported on the second stage through a rolling-contact bearing, and a linear motor causing the turning stage to move angularly towards any desired position over a tiny angle in circular direction.

Another Japanese Patent Laid-Open No. H05-91710, moreover, disclosed a motor for swinging motion, which is comprised of even permanent-magnet segments for field magnet positioned in a circular direction at regular intervals in a way alternating in polarity circularly around a rotating axis, and armature windings equal in number with the poles of the permanent-magnet segments and lying in opposition to the permanent-magnet segments. Either of the permanent-magnet segments and the armature windings serves as the stator while the other is the rotor in a construction that a yoke is always set on the side of the stator.

The prior position-control stage systems constructed as stared earlier, although but having been made compact in construction to a certain extent, nevertheless, are thought to still remaining even larger in size. With these prior position-control stage systems constructed as stated earlier, moreover, the armature windings are made in annular rectangle in configuration while many magnet segments for the field magnet are also made rectangular in shape in order for the manufacturers to utilize versatile components for the linear motors in other linear motion guide units in favor of the stage systems inexpensive in production cost. That is to say, the prior position-control stage systems recited above have required many armature windings for the armature assembly and many magnet segments for the field magnet to generate propulsion to turn the turntable. The armature windings and the magnet segments have been both positioned in circular direction. This circular construction of the armature windings and the magnet segments results in rendering the stage systems large or bulky in contour or in outside diameter thereof.

Thus, it remains a major challenge to make the position-control stage system much smaller in construction, even with enhancing propulsion to turn a turntable.

SUMMARY OF THE INVENTION

The present invention, therefore, has as its primary object to overcome the subject as described just above and more particular to provide a position-control stage system with an onboard direct-drive linear motor in which an armature assembly fits into a circular recess cut in a stationary bed in a way approaching as closer as possible to an outside circular surface of an outer race of a rolling-contact bearing to ensure much space to install the armature assembly on the bed, even with as small as allowed in diametral dimension, and correspondingly a turntable fits over the outer race of the rolling-contact bearing to render the circular linear motor compact or slim in construction, thereby making the stage system itself as smaller as possible in diameter, even with high in propulsion and efficient in operating performances including high-speed traveling, high response, high-precision position-control, and so on.

The present invention is concerned with a position-control stage system; comprising a bed, a turntable supported for rotation on the bed through a rolling-contact bearing, and a motor forcing the turntable relatively to the bed in a circular direction; wherein the motor includes an armature assembly of primary side, which is composed of armature windings made of coreless annular coils wound in a form of a flat configuration, the armature windings lying on the bed in circular direction in a form of a desired circular pattern; wherein the motor includes a field magnet of secondary side, which is composed of magnet segments, which are juxtaposed on the turntable in opposition to the armature windings in such a array that they alternate in polarity circularly in circumferential direction in a form of a desired circular pattern; and wherein the armature assembly of the armature windings on the bed is disposed radially outside of a rolling-contact bearing in a way closely adjacent to the bearing.

In one aspect of the present invention, a position-control stage system is disclosed in which the rolling-contact bearing is comprised of an inner race, an outer race arranged around the inner race, and more than one rolling element of roller interposed between the inner and outer races in such a way any two adjacent rollers are oppositely inclined with their own axes intersecting alternately one another, and wherein the inner race is made with a first threaded hole that is used to fasten directly the inner race to the bed while the outer race is made with a second threaded hole that is used to fasten directly the outer race to the turntable.

In another aspect of the present invention, a position-control stage system is disclosed in which the turntable is fastened to the outer race of the rolling-contact bearing and supported for rotation through the rolling element relatively to the inner race of the rolling-contact bearing, which is fastened to the bed.

In another aspect of the present invention, a position-control stage system is disclosed in which the armature windings and the magnet segments are both made in a form of a trapezoid where a radially inside base is smaller than a radially outside base while circularly opposing diagonals focus equally on a common center of turning, so that the armature windings and the magnet segment, respectively, are allowed lying in close juxtaposition in such a relation that the opposing diagonals of any two adjoining companions come into the closest approach to one another.

In a further another aspect of the present invention, a position-control stage system in which the bed doubles as a coil yoke while the turntable 1 doubles as a magnet yoke.

The position-control stage system of the present invention constructed as stated earlier is allowed to shrink in diameter as smaller as possible, compared with the prior position-control stage system disclosed in the commonly assigned Japanese Patent Laid-Open No. 2004-72960. Even though the bed is constructed as small as allowed in dimension while the turntable is also made as compact as possible to shrink the position-control stage system itself down to any permitted mark, the present invention succeeds in disposing the armature assembly and the field magnet on the bed and the turntable, respectively, which are enough to provide the permanent-magnet motor, which is high in propulsion to drive the turntable in circular direction and efficient in operating performances including high-speed turning, high response, high-precision position-control, and so on.

The above and other related aspects and features of the present invention will be more apparent to those skilled in the art from a reading of the following description of the disclosure found in the accompanying drawings and the novelty thereof pointed out in the appended claims.

DETAILED DESCRIPTION OF THE PREFERRED EMBODIMENTS

The position-control stage system of the present invention is designed to serve well for machinery including semiconductor manufacturing equipment, assembling machines, measuring instruments, testing instruments, position-control table system, sliding table system, and so on, which are expected to operate in any controlled atmosphere as in, for example clean rooms, testing/experimental laboratories, and the like.

Preferred embodiments of a position-control stage system according to the present invention will be explained hereinafter in detail with reference to the accompanying drawings. The position-control stage system of the present invention, besides the constructional features common to the position-control stage system disclosed in the commonly assigned Japanese Patent Laid-Open No. 2004-72960, is envisaged further developing the existing position-control stage system as disclosed previously. The position-control stage system of the present invention is made smaller in dimension compared with the existing position-control stage system, even with simple in construction, and also may achieve high performances including high-speed movement, high response, high-precision position-control, and so on, even with high in propulsion. The position-control stage system of the present invention is made high in stiffness and compact or slim in construction. The position-control stage system of the present invention is used well on a variety of mounting base or instruments including X-axis traveling table, Y-axis traveling table, and so on to achieve the position-control in any of X-, Y- and θ-directions.

The position-control stage system of the present invention is mainly comprised of a stationary bed 2, a turntable 1 carried on the bed 2 for rotation through a rolling-contact bearing 3, and a permanent-magnet motor 24 to drive the turntable 1 in circular direction relatively to the bed 2, which is made with bolt holes 29 that are used to fasten the stage system to any other mounting base including, for example a Y-axis traveling table, and so on. Where the position-control stage system of the present invention would be expected to make the position-control in X-, Y-, and θ-directions, the turntable 1 could control any circular movement in θ-direction.

Figure 10:
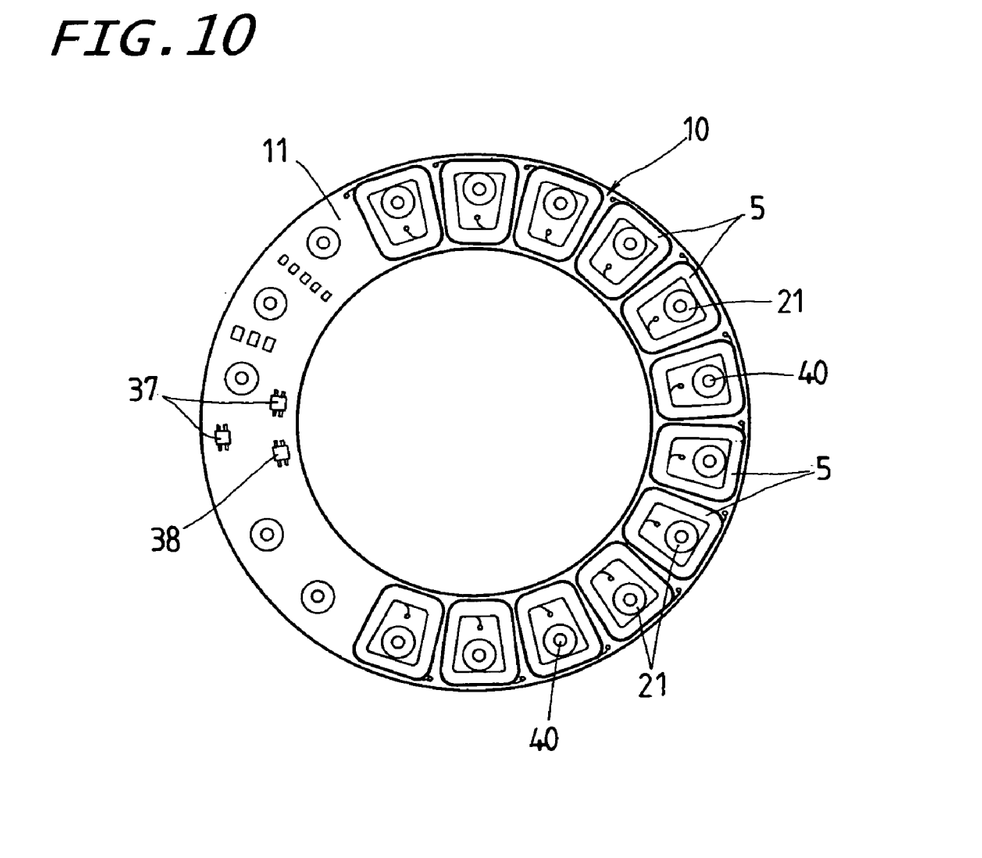
FIG. 10 is a bottom view of the armature assembly of FIG. 9.

The permanent-magnet motor 24 is comprised of a primary side of an armature assembly 10 made up of many armature windings 5, and a secondary side of a field magnet array 4 made up of many permanent-magnet segments 4M. The armature assembly 10 includes many armature windings 5 lying on the bed 2 and a winding board 11 extending to cover throughout over the armature windings 5. As seen in FIG. 10, the armature windings 5 are each provided therein with a collar 21 in which a hole 40 is formed to allow a flat-headed fastening screw 18 to extend through there to tighten the associated armature winding 5 onto the bed 2.

The armature windings 5 are made of three-phase coreless windings, which fit snugly into a circular recess or groove 15 cut into the bed 2 in a way lying circularly on the bed 2. The permanent magnet segments 4M for the field magnet arrays 4 are each made in the form of a flat magnet piece. The permanent magnet segments 4M are juxtaposed in a circular recess or groove 14 cut into the circular underneath of the turntable 1 in opposition to the armature windings 5 in such a array that they alternate in polarity circularly in circumferential direction. With the embodiment discussed here, the permanent-magnet segments 4M are magnet pieces prepared separately from one another to be assembled later into the field magnet array 4. As an alternative, the field magnet array 4 may be made by magnetization of an integral strip material with unlike magnetic poles in a way alternating circularly in polarity. The armature assembly 10 is mounted to the bed 2 while the field magnet array 4 is attached to the turntable 1 whereby the permanent-magnet motor 24 is provided to drive directly the turntable 1.

Figure 8:
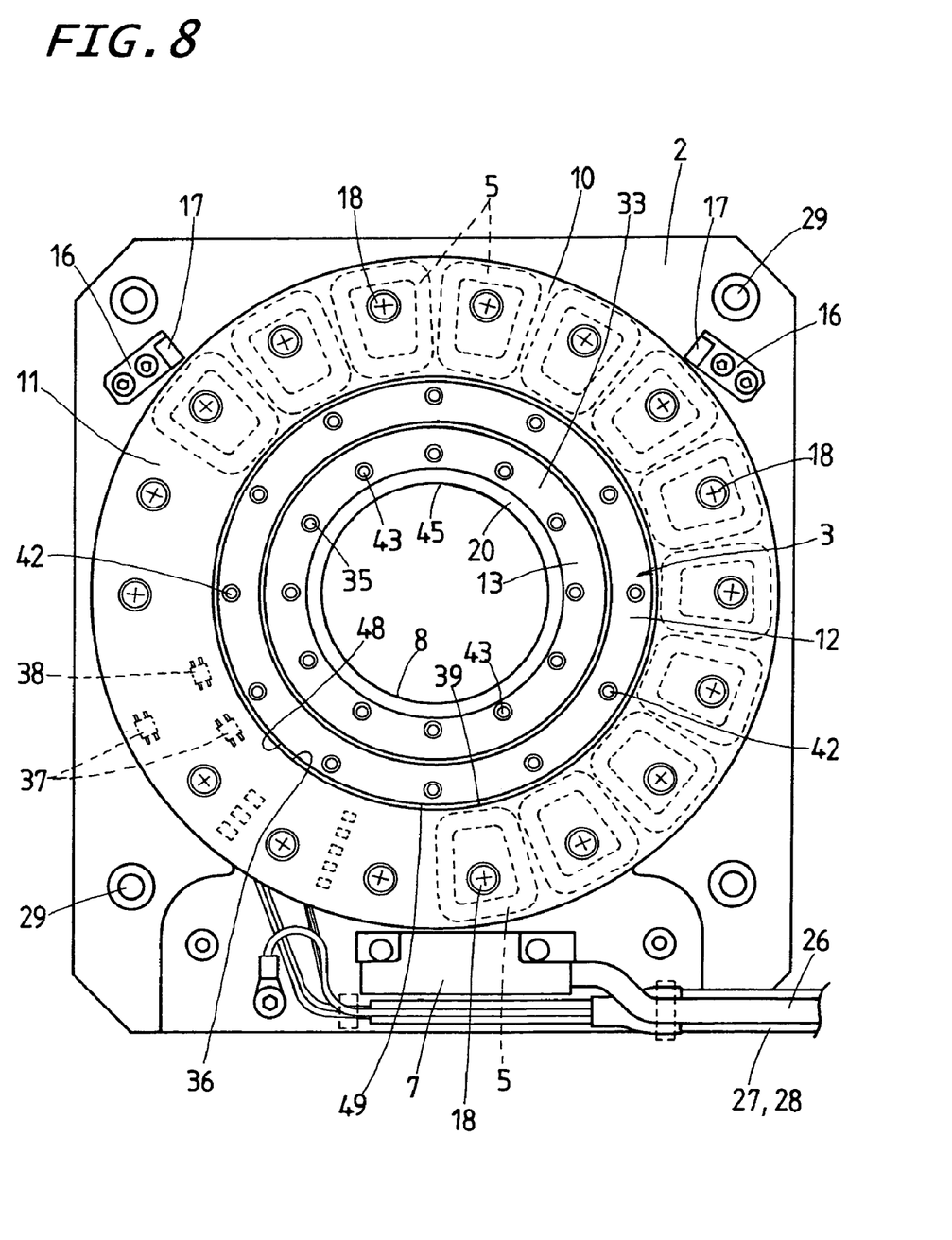
FIG. 8 is a plan view of an armature assembly exposed when the turntable is removed from the position-control stage system of FIG. 2.
Figure 9:
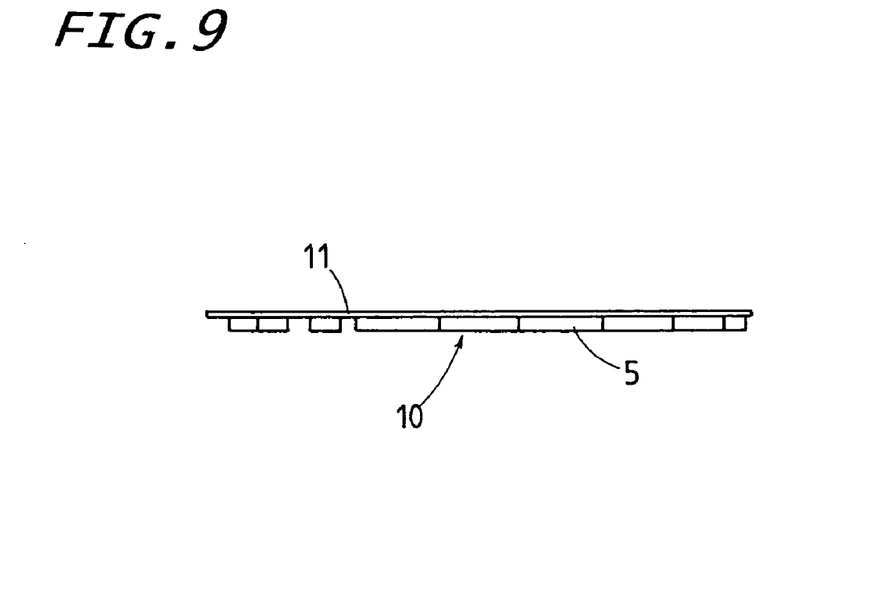
FIG. 9 is a view in elevation of the armature assembly of FIG. 8.

With the position-control stage system in which the turntable 1 is allowed to turn across only a preselected circular area, for example 60 degrees relative to the bed 2 as in the embodiment discussed here, the armature windings 5, as shown in FIGS. 8 and 10, needs not be uniformly disposed throughout the whole circumference in the circular recess 15 on the bed 2, but just twelve armature windings 5 or any multiple armature windings of 3 for the three-phase conduction system are juxtaposed partially in the circular recess 15. On the other hand, the permanent-magnet segments 4 for the field magnet array 4 are not set in array throughout the whole circumference in the circular recess 14 on the turntable 1, but only twenty-one segments 4 are closely juxtaposed in sequence in the circular recess 14 in a way alternating in polarity circularly, or with their unlike poles, or N-pole and S-pole, alternating in polarity along the circular direction. Thus, the permanent-magnet motor could demonstrate the most efficient performance when the three windings 5 correspond to the four magnetic poles of the permanent-magnet segments 4M. It will be understood that the armature windings 5 and the permanent-magnet segments 4M are both selected in number, depending on their dimensions in circular direction, performances needed to force the turntable 1 including magnetic force, torque, rpm, and so on.

A constructional feature in the position-control stage system of the present invention resides in that the armature windings 5 for the armature assembly 10 are disposed on the bed 2 radially outside a rolling-contact bearing 3 in a way closely adjacent to the bearing 3.

The rolling-contact bearing 3 is composed of an inner race 13, an outer race 12 lying to surround around the inner race 13, and more than one rolling element of a roller 31 disposed between the inner and outer races 12 and 13. The rolling-contact bearing 3 is the type referred to as "cross-roller bearings" because of their construction where many cylindrical rollers 31 are arranged in circular direction in such a way any two adjacent rollers 31 are oppositely inclined with their own axes intersecting alternately one another, making it possible to carry both radial and thrust loads.

The armature windings 5 for the circular armature assembly 10 and the magnet segments 4M for the circular field magnet array 4 are both made in the form of a trapezoid where a radially inside base is smaller than a radially outside base while circularly opposing diagonals focus equally on a common center(O) of turning. Thus, the armature windings 5 and the magnet segments 4M, respectively, are allowed lying in close juxtaposition in such a relation that the opposing diagonals of any two adjoining companions come into the closest approach to one another. The armature assembly 10, especially apparent from FIG. 4, fits into the circular recess 15 cut into the bed 2 in a geometry that a inside circular surface 36 of the armature assembly 10 comes into close contact at upper circular edge 39 thereof with a bottom circular edge 49 on an outside circular surface 48 of the outer race 12 of the rolling-contact bearing 3. In other words, the armature assembly 10 fits into the circular recess 15 on the bed 2 in a way that it comes into snugly contact with the outer race 12, yet it is allowed to move in a sliding manner relatively to the associated outer race 12.

With the position-control stage system constructed as stated earlier, the rolling-contact bearing 3 is installed on the turntable 1 while the armature windings 5 fits into the bed 2 in a way approaching as close as possible to or in snugly contact with the outer race 12 of a rolling-contact bearing 3 to make useless area as less as possible in radial direction, thereby ensuring much space to install the armature windings 5 on the bed 2. This constructional feature results in a making the stage system smaller in diameter to shrink the stage system itself, even with making the propulsion to force the turntable more powerful.

With the position-control stage system constructed as stated earlier, moreover, the turntable 1 is made with threaded holes 9 that are used to mount any other components including workpiece, and so on thereon. The outer race 12 of the rolling-contact bearing 3 is made with threaded holes 42 that are used to fasten directly the outer race 12 to the turntable 1. Bolt holes 34 are further made in the turntable 1 to hold the outer race 12 within a bolt hole 34 on the turntable 1 in direct abutment relation. The rolling-contact bearing 3 is fastened directly at the outer race 12 thereof to the turntable 1 with using fastening screws 22 that extend through the bolt holes 34 in the turntable 1, followed by fitting into threaded holes 42 in the outer race 12. The inner race 13 of the rolling-contact bearing 3 is made with threaded holes 43 that are used to fasten directly the inner race 13 to the bed 2. In the bed 2, moreover, there is made bolt holes 35 that are used to hold the inner race 13 in direct abutment relation against another circular setback 33 in the bed 2. The rolling-contact bearing 3 is fastened directly at the inner race 13 thereof to the bed 2 with using fastening screws 23 that extend through the bolt holes 35 in the bed 2, followed by fitting into threaded holes 43 in the inner race 13. The outer race 12 fastened to the turntable 1 is carried for rotation with the inner race 13 through the rolling elements of rollers 31. A specific area where sensors and so on are installed is shielded with a covering member 6 that is attached to the bed 2 to prevent foreign matter against moving in and out.

The turntable 1 is made at the center thereof with a viewing aperture 44 of a diameter(d), while the bed 2 is also provided at the center thereof with a viewing aperture 44. The inner race 13 is further made with a central aperture 46 having a diameter larger than the diameter(d) common to the viewing windows 44, 45. All the apertures 44, 45 and 46 made in the turntable 1, bed 2 and inner race 13, respectively, are located in alignment with one another on the center(O) of turning to provide a viewing window 8.

With the position-control stage system constructed as stated earlier, the turntable 1 is made with the circular setback 32 getting opened to the viewing aperture 44, while the bed 2 is also made with the circular setback 33 getting opened to the viewing aperture 45 to define a circular bearing housing 41. The turntable 1 is further made with a circular flange 19 to separate the circular setback 32 from the circular recess 14, while the bed 2 is made with a circular shoulder 20 to form a boundary between the setback 33 and the viewing aperture 45.

With the position-control stage system constructed as stated earlier, the circular housing 41 to accommodate the rolling-contact bearing 3 therein is provided at a circular room surrounded with the setback 32 and the flange 19 in the turntable 1 and the setback 33 and the shoulder 20 in the bed 2. The outer race 12 is held in place in a way coming into abutment against the setback 32 and the flange 19 in the turntable 1, and thereafter fastened to the turntable 1 with using the fastening screws 22 that extend through the bolt holes 34 in the turntable 1, followed by fitting into the matching threaded holes 42 in the outer race 12. The inner race 13 is held in place in a way coming into abutment against the setback 33 and the shoulder 20 in the bed 2. Then, the inner race 13 is fastened to the bed 2 with using the fastening screws 23 that extend through the bolt holes 35 in the bed 2, followed by fitting into the matching threaded holes 43 in the inner race 13.

With the position-control stage system constructed as stated earlier, the turntable 1 is allowed to turn in any desired circular direction across a preselected circular range or angles θ to move any object including instruments, components, works and so on, mounted on the turntable 1, towards a desired position. In the embodiment of the position-control stage system explained here, the preselected circular range or angles θ is set to ±30 degrees.

Figure 3:
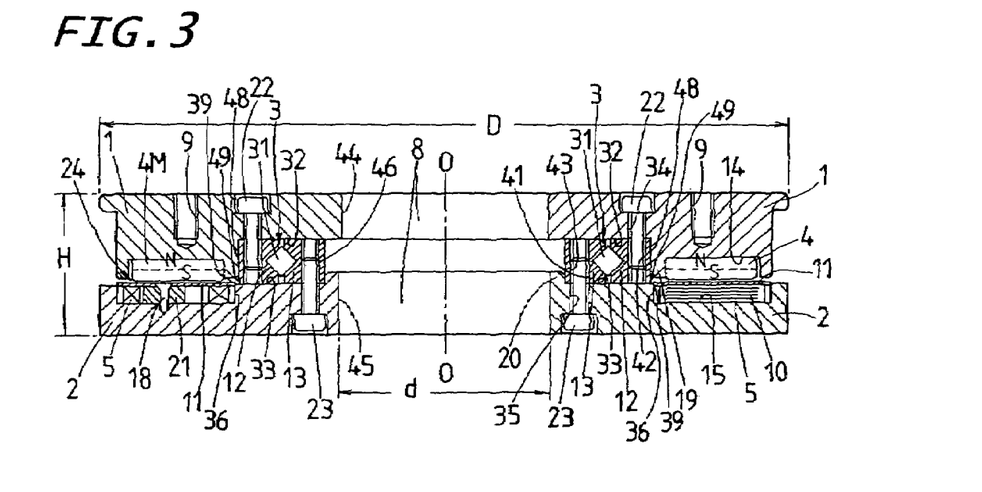
FIG. 3 is a view in cross section of the position-control stage system of FIG. 2, the view being taken along the plane I-O-I of the same figure.

The position-control stage system of the present invention features that the armature assembly 10 of the armature windings 5 fits into the bed 2 in a condition approaching as closer as possible to the outside circular surface of the outer race 12 of the rolling-contact bearing 3 as shown in FIG. 3, thereby making the turntable 1 smaller in the outside diameter(D) as well as the position-control stage system compact or slim in the overall height(H).

Figure 4:
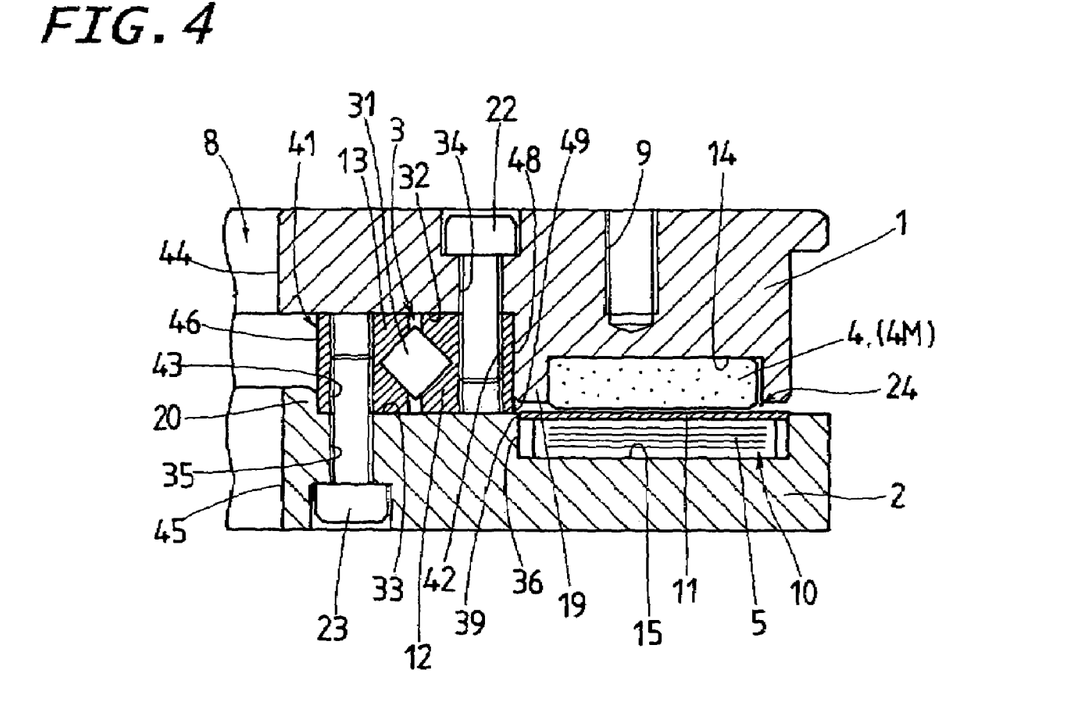
FIG. 4 is an enlarged fragmentary view in transverse section of the position-control stage system shown in FIG. 3.

With the position-control stage system of the present invention, the armature windings 5, as seen in FIGS. 3, 4 and 8, are disposed radially outside the outer race 12 in the circular direction in a way lying in just immediate vicinity of or in tangential contact with the outside diameter of the outer race 12 to make the position-control stage system more compact in construction. In the prior position-control stage system ever developed, in contrast, a circular flange rises above the bed in immediate outside vicinity of the rolling-contact bearing and correspondingly makes the dimension larger in diameter, thus responsible for making it impossible to render the position-control stage system compact or slim in construction.

With the position-control stage system made compact in construction according to the present invention, as shown in FIG. 3, the turntable 1 is fastened to the outer race 12 of the rolling-contact bearing 3 while the bed 2 is fastened to the inner race 13 of the bearing 3. The outer race 12 is allowed to rotate around the inner race 13 by virtue of the rolling elements interposed between the outer and inner races 12, 13.

According to the position-control stage system constructed as stated just above, the circular flange 20 raised above the bed 2 is formed radially inside the inner race 13 of the rolling-contact bearing 3. Thus, there is no need of the circular flange raised above the turntable 1, which is farther out the outside diameter of the outer race 12 of the rolling-contact bearing 3 as in the prior position-control stage systems, thereby ensuring much space enough to install the armature assembly of desired dimension. The shoulder 20 made on the bed 2 is to locate precisely in place the inner race 13 of the bearing 3 with causing no misalignment relative to the bed 2. With the position-control stage system made compact in construction as stated earlier, as shown in FIG. 3, the rolling-contact bearing 3 is the type referred to as cross-roller bearing where many rolling elements of cylindrical rollers 31 are arranged in circular direction in such a way any two adjacent rollers 31 are oppositely inclined with their own axes intersecting alternately one another. The cross-roller bearing, as needing no retainer plate to keep the bearing in the bearing housing, contributes to more shrinking the position-control stage system.

Figure 6:
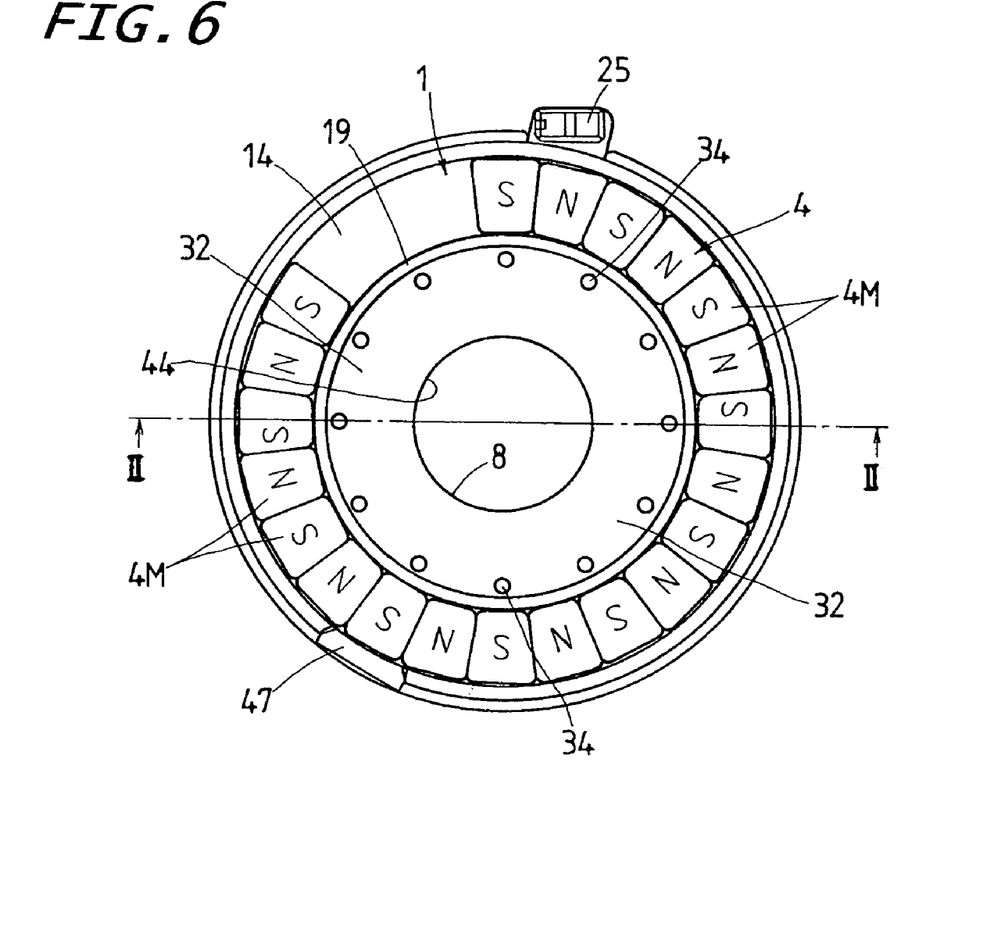
FIG. 6 is a bottom view of the turntable of FIG. 5.
Figure 7:
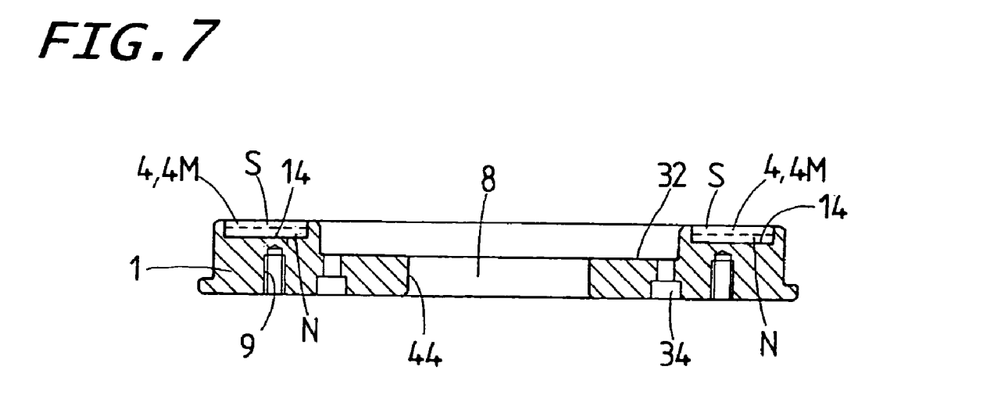
FIG. 7 is a view in transverse section of FIG. 6, the view being taken along the plane II—II of the same figure.

The position-control stage system of the present invention, even though made compact in construction as stated earlier, is expected to demonstrate more powerful propulsion to force circularly the turntable 1. To cope with this, the armature windings 5 for the circular armature assembly 10 and the magnet segments 4M for the circular field magnet array 4, as shown in FIGS. 1, 2, 6, 8 and 10, are both made in the form of a trapezoid where their circularly opposing diagonals focus or converge equally on the common center (O) of turning to allow the armature windings 5 and the magnet segments 4M, respectively, lying in close juxtaposition in conformity with any desired circular pattern on the upper surface of the bed 2 or on the lower surface of the turntable 1. With the position-control stage system of the present invention, in order to make the stage system itself more compact in construction, both the bed 2 and the turntable 1, as sown in FIG. 3, are made with magnetic material to get them doubling as magnet yoke to complete magnetic path. Moreover, as seen in FIGS. 3, 6 and 7, the bed 2 is made with a circular recess or groove 15 to fit the armature windings 5 into there, while the turntable 1 is also made with a circular recess or groove 14 to fit the permanent-magnet segments 4M for the field magnet array 4 into there.

With the position-control stage system of the present invention, as shown in FIGS. 2, 6, 8 and 10, the field magnet array 4 is made up of twenty-one magnet segments 4M while the armature assembly 10 is made up of twelve armature windings 5. This constructional relation in their numbers between the magnet segments 4M and armature windings 5 is beneficial to allowing the turntable 1 to turn across considerably wide range in circular direction with more powerful propulsion to force circularly the turntable 1, and ensuring the desired performances in high-speed operation, high response and high accuracy in position control.

Figure 1:
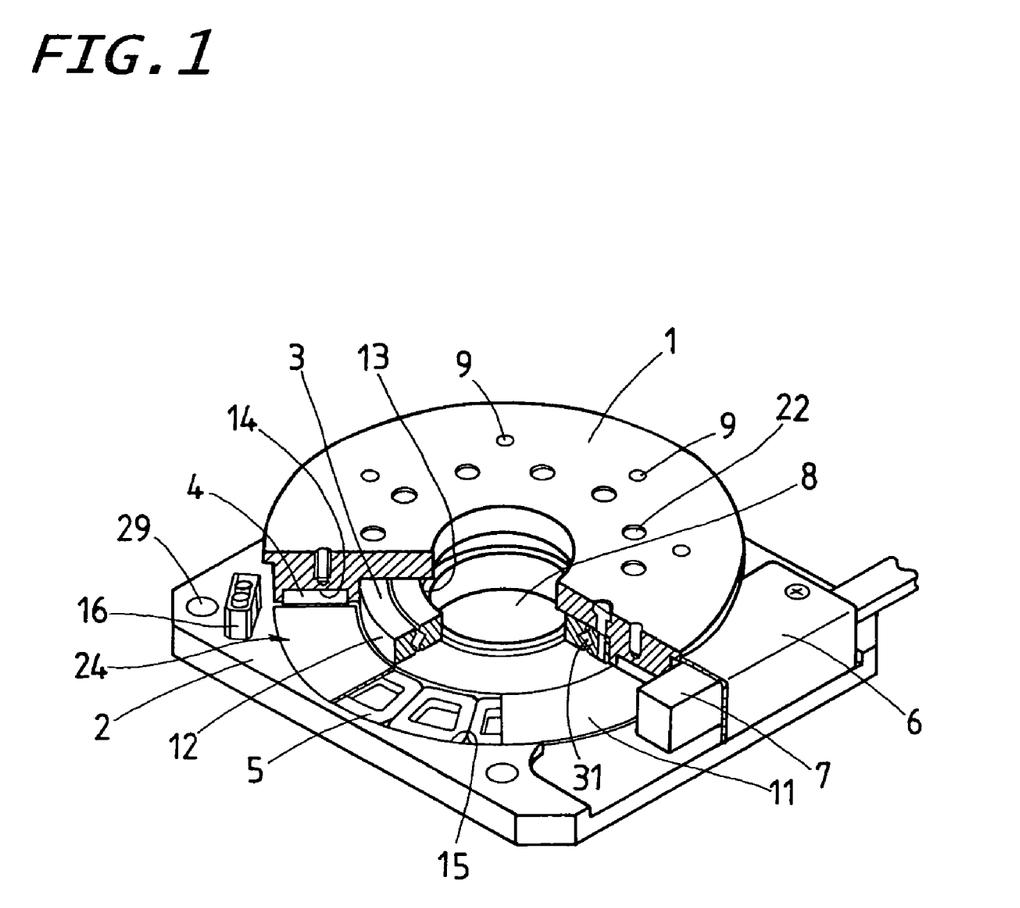
FIG. 1 is a partially cutaway view in perspective of a preferred embodiment of a position-control stage system according to the present invention.
Figure 2:
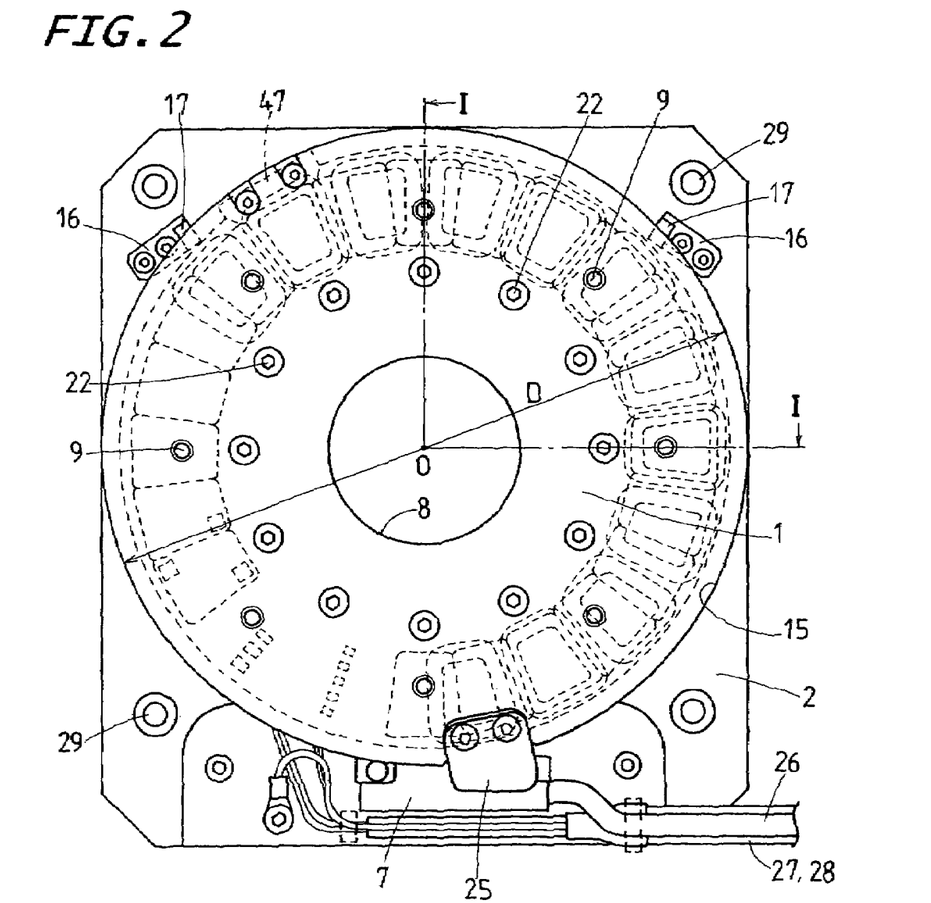
FIG. 2 is a plan view of the position-control stage system of FIG. 1, but in which a covering member is removed.
Figure 5:
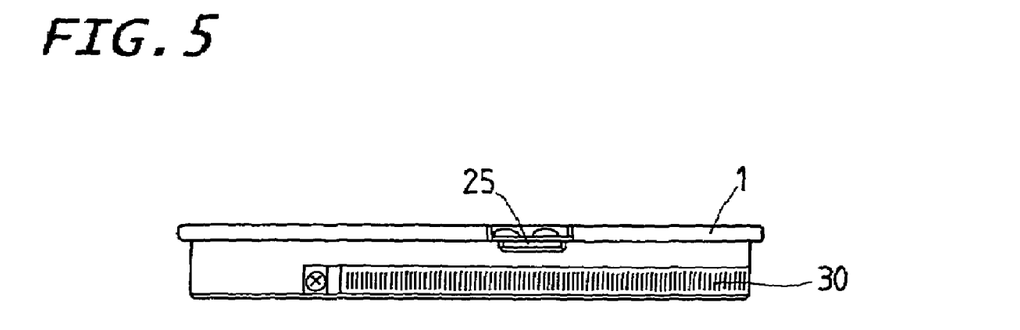
FIG. 5 is a view in front elevation of a turntable incorporated in the position-control stage system shown in FIG. 2.

The position-control stage system of the present invention, as shown in FIGS. 2, 5 and 8, further includes an encoder to sense a circular position of the turntable 1 relative to the bed 2, which are composed of an optical scale 30 extending in the circular direction around a peripheral surface of the turntable 1, and a sensor 7 installed on the bed 2 in opposition to the optical scale 30. On the turntable 1, there is provided an origin mark 25 in opposition to the sensor 7 to determine the home position of the turntable 1. The sensor 7 connects with a sensor line 26 while the armature assembly 10 is communicated with a power line 27 to carry a three-phase current to the armature windings 5 and a signal line 28 to apply a conduction signal to the armature windings 5. The sensor line 26, power line 27 and signal line 28 are all supported on the bed 2. With the position-control stage system of the present invention, moreover, as shown in FIGS. 1, 2, 6 and 8, a stopper 16 is provided on the bed 2 while another stopper 47 is on the turntable 1 to keep the turntable 1 against turning beyond the preselected circular range. Of the stoppers, only the stopper 16 has a urethane rubber 17 to alleviate collision against the counterpart.

With the position-control stage system constructed as stated earlier, as shown in FIGS. 8 and 10, the armature assembly 10 includes Hall-effect elements or Hall ICs, some of which serve as limit sensors 37 and others are before-origin sensors 38. These sensors 37, 38 respond to the field magnet array 4 to stop the turntable 1 within the allowable maximum turning range. Besides, the turntable 1 and the bed 2 are both made with viewing windows 8 that are available for image processing, viewing measurement, and so on.

What is claimed is:

1. A position-control stage system; comprising a bed, a turntable supported for rotation on the bed through a rolling-contact bearing, and a motor forcing the turntable relatively to the bed in a circular direction;

wherein the motor includes an armature assembly on a primary side, which is composed of armature windings made of coreless annular coils wound in a form of a flat configuration, the armature windings lying on the bed in circular direction in a form of a desired circular pattern;

wherein the motor includes a field magnet on a secondary side, which is composed of magnet segments, which are juxtaposed on the turntable in opposition to the armature windings in such a array that they alternate in polarity circularly in circumferential direction along a desired circular pattern; and wherein the bed doubles as a coil yoke while the turntable doubles as a magnet yoke;

wherein the rolling-contact bearing is comprised of an inner race, an outer race arranged around the inner race, and more than one rolling element of rollers interposed between the inner and outer races in such a way any two adjacent rollers are oppositely inclined with their own axes intersecting alternately one another;

wherein the inner race is fixed in abutment to the bed only by a screw through the bed and threaded in a first threaded hole in the inner race and the outer race is fixed in abutment to the turntable only by a screw through the turntable and threaded in a second threaded hole in the outer race;

wherein the armature assembly of the armature windings on the bed fits into an annular recess, which is made in a top side of the bed with an inner circumference of the recess spaced apart from an outside circular surface of the outer race of the bearing wherein there being no intervening structure between the inner circumference and the outside circular surface, the space between the inner circumference and the outside circular surface can be reduced to the point that the armature windings are as close as desirable to or in contact with the outer race; and wherein the armature windings and the magnet segments are both made in a form of a trapezoid where a radially inside base is smaller than a radially outside base while circularly opposing diagonals focus equally on a common center of turning, so that the armature windings and the magnet segment, respectively, are allowed lying in close juxtaposition in such a relation that the opposing diagonals of any two adjoining companions come into the closest approach to one another.

* * * * *